June 1, 1965
N. BEREDJICK
3,187,067
METHOD OF MAKING POLYSTYRENE-ETHYLENE GRAFT
COPOLYMER AND PRODUCT THEREFROM
Filed July 20, 1960
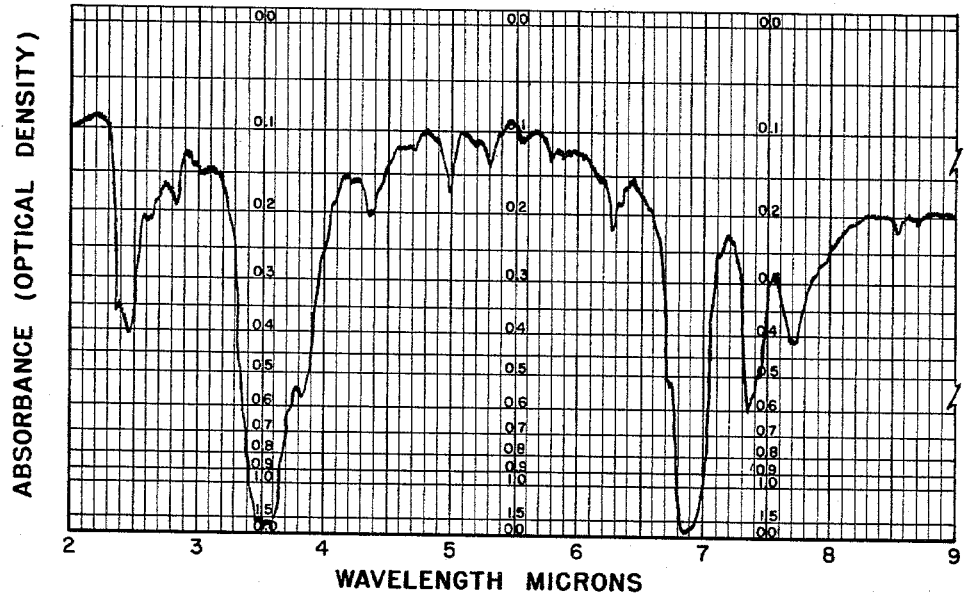
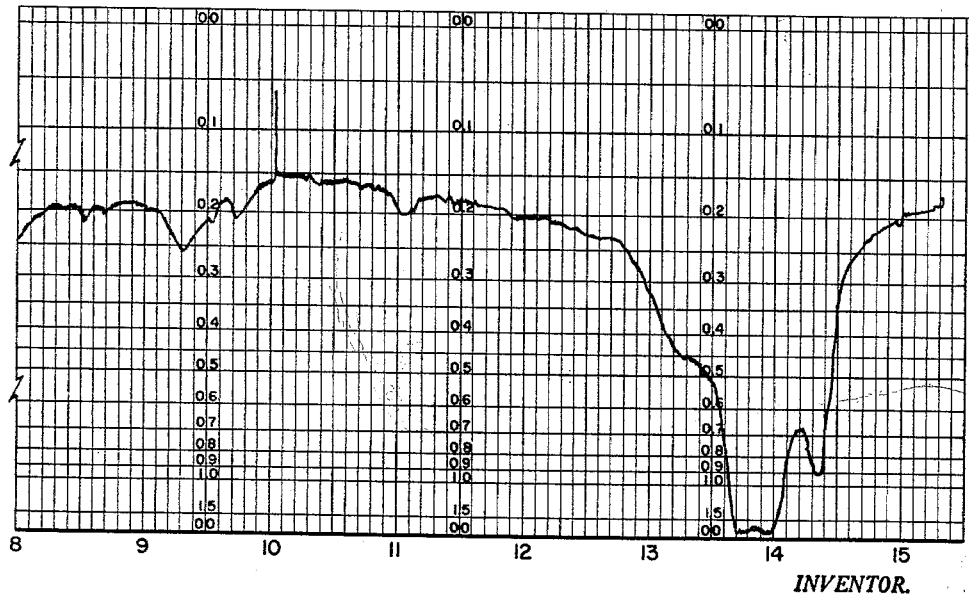
INVENTOR.
Nicky Beredjick
BY
*Samuel Kahn*
ATTORNEY 3,187,067
METHOD OF MAKING POLYSTYRENE-ETHYL-ENE GRAFT COPOLYMER AND PRODUCT THEREFROM
Nicky Beredjick, Chicago, Ill., assignor to Standard Oil Company, Chicago, Ill., a corporation of Indiana
Filed July 20, 1960, Ser. No. 44,118
7 Claims. (Cl. 260—877)

This invention relates to a new and improved polymerization process and is particularly concerned with the preparation of novel graft copolymers of alpha-olefins. More specifically, the invention is concerned with improved processes for the graft copolymerization of olefins such as ethylene, propylene and mixtures thereof with novel polymeric catalysts of the coordinate type.

In Belgian Patents 533,362, 534,792 and 534,888 there is described a process for the preparation of high molecular weight polyethylenes. By the process described in these patents, ethylene is contacted under relatively mild conditions of temperature and pressure with mixtures of (a) a reducing agent such as an alkali metal-, an alkaline earth metal- or an earth metal-organometallic compound and (b) a halide or organometallic compound of a transition metal of Groups 4a–6a of the Periodic Table, e.g. Ti, Zr, Hf, V, Cr, etc., including Th and U. Mixtures of organo-aluminum compounds and titanium tetrahalides or zirconium tetrahalides have proved to be especially efficacious for initiating the polymerization of ethylene.

In the polymerization of ethylene in accordance with the processes of the above-mentioned patents, the process is usually carried out by mixing the catalyst components in a hydrocarbon diluent and then passing the ethylene into the catalyst mixture at atmospheric or slightly elevated pressure and at room temperature or moderately elevated temperatures, e.g. up to about 100° C. The polymeric product which is formed under such reaction conditions is generally of high molecular weight, usually exceeding 100,000 and often as high as 1–2 million.

Much research has been directed to studying the mode of operation of heterogeneous coordinate catalysts such as those described in the above patents. It has been found that in the polymerization of ethylene by means of complex coordinate catalysts containing organo-aluminum compounds, hydrocarbon groups are transferred from the catalytically active complex to the polymer chains if they are originally attached to the aluminum atom but are not transferred if they are attached to the titanium atom (see for example, "Linear and Stereoregular Addition Polymerization," N. G. Gaylord and H. F. Mark, p. 210, Interscience Publishers, N.Y., 1959, and G. Natta, J. Pol. Sci. XXVI, p. 120 (1957)). Similarly, polyethylene prepared with a phenyl magnesium bromide-titanium tetrachloride catalyst combination contains phenyl groups in the polymer molecule (Gaylord and Mark, p. 173). Since, however, such hydrocarbon end groups on the polymer as are derived from the initiating catalyst species are of insignificant molecular weight compared to the overall molecular weight of the polymeric product, their effect has been hitherto ignored, and the polymeric product considered, for all practical purposes, a homopolymer of the alpha-olefin employed in the polymerization.

My invention provides a radically novel process for the preparation of graft polymers of alpha-olefins by employing, as the organo-metallic component of a coordinate catalyst system, a metallic derivative of a preexisting high polymer. Thus, the phenomenon of transfer of a hydrocarbon radical of the catalyst to the growing end of the polymer chain, as described above, is employed with advantage to initiate polymerization of an alpha-olefin on a hydrocarbon end group which is itself a polymer. Since the molecular weight of the hydrocarbon portion of the metallic derivative of the preexisting high polymer is relatively large in comparison to the molecular weight of the polymer produced, my invention provides a method for producing graft polymers of alpha-olefins on a vinyl polymer base or backbone.

Briefly, in accordance with the process of my invention, polymers or copolymers of styrene containing one or more halogen atoms in the benzene nucleus are treated with a metalating agent such as an alkali metal, an alkaline earth metal or an organometallic compound thereof, e.g. lithium, lithium alkyl, etc., to form a metallo-derivative of a styrene polymer. The polymeric metallo-organic compound so formed is employed as one component of a coordinate catalyst system for effecting the polymerization of an alpha-olefin. As the second component of the catalyst, I employ a metallic compound of Groups 4a–6a of the Periodic Table, preferably a titanium or zirconium halide such as $TiCl_4$, $TiCl_3$, $ZrCl_4$ or the like. Polymerization is effected at 20–150° C., preferably 50–100° C., by passing the alpha-olefin into the stirred or refluxing solution containing the catalyst components. At the end of 2–24 hours, the graft polymer so formed is precipitated from solution by addition of methanolic hydrochloric acid, filtered and washed. Unreacted styrene polymer or copolymer is removed by extraction of the reaction product with a suitable solvent, and the graft polymer recovered as an insoluble residue.

The polymeric organo-metallic compounds which are employed as co-catalysts in the process of my invention can be prepared by metalation of a polymer or copolymer of styrene containing one or more halogen atoms in the benzene nucleus. Among such polymers are polybromostyrene, polychlorostyrene, copolymers of styrene and mono- or di-halostyrene, e.g. a copolymer of 50–95 parts of styrene and 50–5 parts of monobromostyrene, etc. Polymers of nuclearly halogenated alpha-methylstyrene, and copolymers of alpha-methylstyrene with halostyrene or nuclearly halogenated alpha-methylstyrene can also be employed. A wide variety of copolymers and terpolymers of styrene or methylstyrene with bromostyrene or chlorostyrene and other reactive vinyl compounds, e.g. methylvinylketone, maleic anhydride, acrylonitrile, alkyl acrylates, alkyl methacrylates, and the like may be used for the preparation of the polymeric organo-metallic compound employed as a catalyst component. The essential requirement of the polymer used is that it be capable of reaction with a Group 1–2 metalating agent to form a polymeric organo-metallic compound. For this purpose, I prefer to employ a polymer of monobromostyrene or copolymer of styrene and monobromostyrene as hereinbefore described.

A preferred polymer for the preparation of the polymeric organometallic compound used as a catalyst component is a copolymer of styrene and p-bromostyrene containing from about 4 to 30% by weight bromine in the molecule. Such polymers can readily be prepared by free radical polymerization, employing a peroxide or other free-radical forming catalyst, of a mixture of styrene and p-bromostyrene. Generally, suitable polymers of this type have a molecular weight in the range of 80,000 to about 250,000, corresponding to an intrinsic viscosity (measured in benzene at 30° C.) from about 0.4 to about 1.0 dl./g. The presence of bromine substituents on the benzene rings of the polymer permits metalation of the polymer by conventional means, for example by reaction with Li metal or alkyl lithium compounds. Other methods of metalating, for example as described in Gilman, "Organic Chemistry," 2nd edition, vol. I, can be employed, and the particular metalating agent employed can be an alkali metal or alkaline earth metal or organo-metallic derivative thereof.

The presence of halogen, especially bromine, substituents on the benzene rings of the polystyrene backbone permits metalation of the polymer by conventional means, for example by reaction with an alkali metal or alkaline earth metal, or organo-metallic derivative of these metals. Particularly effective for this purpose are lithium metal or hydrocarbon lithium compounds, such as alkyl lithium wherein the alkyl groups have from 2 to 10 carbon atoms in the molecule; aryl lithiums such as phenyl lithium, naphthenyl lithium, etc. The conversion of the polymeric halostyrene polymer or copolymer to a Grignard reagent, which can be effectively employed in the process of my invention, can be accomplished by conventional means, e.g. by reaction of the polymer with activated magnesium metal in the present of a trace of iodine, etc.

In accordance with the process of my invention, I prefer to employ alkyl lithium of the type referred to hereinbefore as metalating agent, and to effect metalation of selected styrene/para-bromostyrene copolymers in an inert hydrocarbon solvent. For this purpose, I employ aliphatic hydrocarbon solvents, e.g. having from about 5–15 carbon atoms per molecule, such as pentane, heptane, isooctane, etc. or mixtures thereof. Aromatic hydrocarbon solvents are to be avoided since they are themselves subject to reaction with alkyl lithium compounds. The metalation is effected at temperatures between about room temperature (20 C.) and 150° C., sufficient to effect conversion of at least about 50% of the bromine content of the polymer to the metallo derivative. In effecting the metalation of the polystyrene backbone polymer, I employ the metalating agent in an amount approximately equivalent (stoichiometric basis) to the bromine present in the polymer, although a slight excess for example up to 5–10% excess may be used. Large excess of alkyl lithium is avoided since it can exert a catalytic polymerizing effect in the presence of the metal halide component of the catalyst.

The metalated polystyrene prepared as hereinbefore described, in inert aliphatic hydrocarbon solvent, is employed together with a metal halide of metals of Groups 4a–6a of the Periodic Table as a catalyst for copolymerization of added alpha-olefin. Various metal halides known to be effective as polymerization catalysts can be employed for this purpose, e.g. $TiCl_4$, $TiCl_3$, $ZrCl_4$, $TiBr_4$, $HfCl_4$, $VOCl_3$, $CrCl_3$, $CrOCl_3$, $MoCl_6$, etc., but of these the halides and subhalides, especially the chlorides, of titanium are preferred. The polymeric metallo-organic compound can be contacted first with the olefin to be copolymerized, or alternatively the catalyst components can be premixed, and the olefin bubbled into the solution or suspension of catalyst in an inert hydrocarbon solvent. The metal halide catalyst, e.g. $TiCl_4$, is employed in an amount between about 0.01 and about 0.1 equivalent per gram equivalent alkali metal employed in the process.

The alpha-olefin which is graft polymerized in the process of the invention can contain from 2 to about 8 carbon atoms in the molecule. Examples of suitable feedstocks to the process are ethylene, propylene, butene-1, isobutene, pentene-1, 3-methylbutene-1, hexene-1, 4-methylpentene-1, 4-methylhexene-1,5-methylhexene-1, and the like.

Graft copolymerization of the alpha-olefin, e.g. ethylene, with the metalated polystyrene polymer is effected at temperatures in the range of 20 to about 100° C. and pressures between atmospheric and 1000 p.s.i., preferably 15–200 p.s.i.g. The polymeric product obtained is readily recovered by treating the precipitated polymer with suitable agents for removing catalyst, for example, by contacting with water, methanolic HCl or the like. The recovered polymer is washed and dried, and can be extracted with a solvent to preferentially remove unreacted backbone polymer, e.g. with dioxane. The unextracted residue is a true graft-polymer of the polystyrene backbone and the alpha-olefin polymer, e.g. ethylene, employed, and contains from about 1 to about 10% by weight polystyrene incorporated in the polymer molecule. The graft polymers prepared by the process of the invention are characterized by softening points above about 125° C., intrinsic viscosity (measured in decalin at 130° C.) between about 2 and 12, and infrared spectra having typical absorption peaks at 9.3, 9.7, and 14.3 microns. The following examples are given in illustration and are not intended as limitations on the scope of this invention.

PREPARATION OF BACKBONE POLYMER

Styrene was copolymerized with p-bromostyrene in benzene solution at 60° C. for 117 hours with 0.1 mole percent benzoyl peroxide as catalyst. Copolymers were prepared with a 2/1; 4/1; 8/1; and 16/1 initial charge mole ratio of styrene to para-bromostyrene in accordance with the following typical procedure.

A solution of 3.33 g. of freshly distilled styrene and 2.93 g. para-bromostyrene (2:1 mole ratio) was placed in a 250 ml. round bottom flask containing 0.0116 g. of benzoyl peroxide in 27 ml. benzene previously distilled over sodium. The flask was connected to a mercury diffusion pump; the contents frozen in a Dry Ice-acetone mixture and flask evacuated. It was then thawed, refrozen and the degassing treatment repeated three more times until a vacuum of about $10^{-4}$ mm. Hg was reached. It was then sealed off, thawed and placed in a constant temperature bath at 60° C. ±0.2° C. for a period of one hundred and seventeen hours. At conclusion of this period, the flask contents were diluted with 100 ml. benzene and the clear solution was precipitated into 600 ml. methanol under rapid agitation. The fine powdery white solid material was collected by filtration, air dried for 6–8 hours then redissolved in 100–150 ml. benzene and reprecipitated into 600 ml. methanol as described above. This procedure was repeated twice. Finally the polymer was air dried for 6–8 hours and then for 24–48 hours in a 60° C. vacuum oven to constant weight. It had an intrinsic viscosity of 0.435 and contained 26.6% bromine by weight.

The copolymers prepared as described had the following properties:

| Run No. | Mole Ratio, Styrene/p-bromostyrene | Intrinsic Viscosity Benzene—30° C. | Percent Bromine (Wt.) |
| --- | --- | --- | --- |
| 1 | 2/1 | 0.435 | 26.6 |
| 2 | 4/1 | 0.523 | 15.5 |
| 3 | 8/1 | 0.485 | 9.8 |
| 4 | 16/1 | 0.604 | 4.6 |

*Example*

A solution of 1.2 g. of styrene para-bromostyrene polymer (4:1 mole ratio—Run No. 2) in 60 ml. of dry benzene was prepared by stirring at 60° C. under nitrogen for about 15 minutes. To this solution was added 11.06 ml. of a 15.5 weight percent solution of n-butyl lithium in a solvent consisting of ⅓ pentane–⅔ heptane (by volume). After addition, the mixture was heated to 95° C. and maintained with stirring for ½ hour at this temperature, then ethylene gas was bubbled into the solution at about 5 p.s.i. pressure for ¼ hour.

To the ethylene-saturated solution was added 0.50 cc. of $TiCl_4$ (0.363 g.) and the solution maintained under 5 p.s.i. ethylene pressure at reflux for 2 hours. The reaction mixture was then cooled to room temperature and treated with 500 ml. methanolic HCl. The solids were separated and treated three times with 500 ml. portions of methanolic HCl in a Waring Blendor, then washed with acetone and dried. The dry polymer was extracted with 150 ml. dioxane for 17–18 hours to remove unreacted styrene/para-bromostyrene copolymer, and the raffinate dried at 80° C. under vacuum to constant weight. A yield of 5.08 g. of solid polymer was obtained which yielded no soluble material on further extraction with dioxane.

The polymeric product so obtained had a density of 0.936 and Vicat softening point of 129° C. The infrared absorption spectrum of this graft polymer as shown in the accompanying drawing, showed a pronounced absorption at 9.3, 9.7, and 14.3 microns, which are typical absorption bands for polystyrene. Comparison of the IR spectrum with the spectrum of polystyrene indicated the presence of 1.2–1.5 weight percent styrene units in this polymer.

X-ray analysis of the polymer indicated the polymer was 82.5% crystalline.

It will be understood that although the specific description has been concerned with the graft copolymerization of ethylene, the copolymerization of other olefins with styrene polymers can be effected in similar manner. Such other olefins include compounds containing an aliphatic double bond, especially those in which the double bond is in the 1 position. Typical examples of these olefins are propylene, butylenes, pentenes, hexenes, etc., and the diolefins, such as 1,3-butadiene, isoprene and the like.

The present process can and usually will be carried out at relatively low pressures. The operativeness of the process, however, is not dependent upon the use of low pressures, and elevated pressures can be used. Similarly, the temperature is not a critical condition of the process. Preferred temperatures are within the range of about 20° to 100° C.

The graft polymers produced by the process of the invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, plasticizers, pigments, etc. may be incorporated in the polymers. The polymers produced by the present invention can be subjected to chemical modifying treatments, such as halogenation, sulfohalogenation, irradiation, etc. to produce useful modifications thereof.

I claim:

1. A process for preparing graft copolymer compositions which comprises the steps of reacting a copolymer of styrene and monobromostyrene in an inert hydrocarbon medium with a member selected from the group consisting of alkali and alkaline earth metals and hydrocarbon compounds thereof to form a polymeric organo-metallic compound, contacting said polymeric organo-metallic compound with an alpha-olefin under polymerization reaction conditions in the presence of a co-catalyst comprising a metal salt of a metal selected from the class consisting of Groups 4a, 5a and 6a of the Periodic Table and separating a graft copolymer of said copolymer and said alpha-olefin therefrom.

2. Process of claim 1 wherein said alpha-olefin is ethylene.

3. Process of claim 1 wherein said metal salt is $TiCl_4$.

4. A process for preparing graft copolymer compositions which comprises the steps of reacting a copolymer of 50–95% by weight styrene and 50–5% by weight monobromostyrene having an intrinsic viscosity in benzene at 30° C. between about 0.4 and about 1.0 dl./g. in an aliphatic hydrocarbon solvent with an alkyl lithium having from 5 to 15 carbon atoms in the alkyl group at a temperature of 0° to about 150° C., the alkyl lithium being employed in an amount between about 1.0 and 1.1 equivalents per atom of bromine in said copolymer, contacting the reaction product with ethylene under polymerization reaction conditions in the presence of 0.1 to 2 equivalents $TiCl_4$ per gram equivalent of lithium, and separating a graft copolymer of said copolymer and ethylene.

5. The process of claim 4 wherein the graft copolymer is purified by extraction with a solvent having preferential solubility for the styrene para-bromostyrene copolymer.

6. Process of claim 5 wherein dioxane is employed as the solvent for extraction.

7. As a new composition of matter, a crystalline graft copolymer of ethylene on a polystyrene backbone wherein said ethylene is grafted onto benzene nuclei of said polystyrene backbone, said crystalline graft copolymer having an intrinsic viscosity (measured in decalin at 130° C.) between about 2 and 12, a Vicat softening point of about 129° C., a density of 0.93 to 0.95 and an IR absorption characterized by maxima at 9.3, 9.7, and 14.3 microns.

References Cited by the Examiner

UNITED STATES PATENTS

| | | | |
|---|---|---|---|
| 2,837,496 | 6/58 | Vandenberg | 260—877 |
| 2,947,718 | 8/60 | Rugg et al. | 260—878 |
| 2,960,480 | 11/60 | Thielen | 260—886 |
| 3,031,432 | 4/62 | Kern | 260—881 |

FOREIGN PATENTS 777,538  6/57  Great Britain.

OTHER REFERENCES

Fox et al.: Journal of Polymer Science, vol. 31, pages 173–177.

Boundy et al.: Styrene, page 368, Reinhold Publishing Corporation, New York, 1952.

MURRAY TILLMAN, *Primary Examiner.*

D. ARNOLD, LEON J. BERCOVITZ, WILLIAM H. SHORT, *Examiners.*